United States Patent

Komaki et al.

Patent Number: 5,201,611
Date of Patent: Apr. 13, 1993

[54] PRESSURE EQUALIZER FOR USE AT DEEP SEA

[75] Inventors: Hideaki Komaki, Tokyo; Shinji Taira, Yokosuka; Tadashi Shibue, Yokohama, all of Japan

[73] Assignee: Ishikawajima-Harima Jukogyo Kabushiki Kaisha, Tokyo, Japan

[21] Appl. No.: 821,061

[22] Filed: Jan. 16, 1992

[30] Foreign Application Priority Data

Jul. 30, 1991 [JP] Japan ............... 3-211434

[51] Int. Cl.$^5$ .............................. B63C 11/44
[52] U.S. Cl. ................... 405/193; 405/185; 405/210
[58] Field of Search ............ 405/210, 193, 188, 191; 114/333, 331, 312, 332

[56] References Cited

U.S. PATENT DOCUMENTS

| 3,716,009 | 2/1973 | Strickland | 114/333 |
| 4,402,632 | 9/1983 | Cook | 405/210 |
| 4,662,386 | 5/1987 | Pedersen | 405/210 X |
| 4,903,628 | 2/1990 | Lansford | 405/193 X |
| 5,074,715 | 12/1991 | Vigander | 405/210 |

FOREIGN PATENT DOCUMENTS 2312014 10/1973 Fed. Rep. of Germany ...... 405/193

Primary Examiner—Dennis L. Taylor
Attorney, Agent, or Firm—Oblon, Spivak, McClelland, Maier & Neustadt

[57] ABSTRACT

A pressure equalizer for use for storing, generating and dispensing gas from substantially thin walled tanks at great depth beneath the sea has a gas generating tank contains a low-temperature, liquified gas which upon the application of heat generates a high-pressure gas which is stored in a gas storage tank into and out of which sea water freely flows through the bottom. A gas supply line is connected at one end by branches to the tops of the respective tanks and at the other end to a device utilizing gas generated in the gas generating tank.

1 Claim, 6 Drawing Sheets

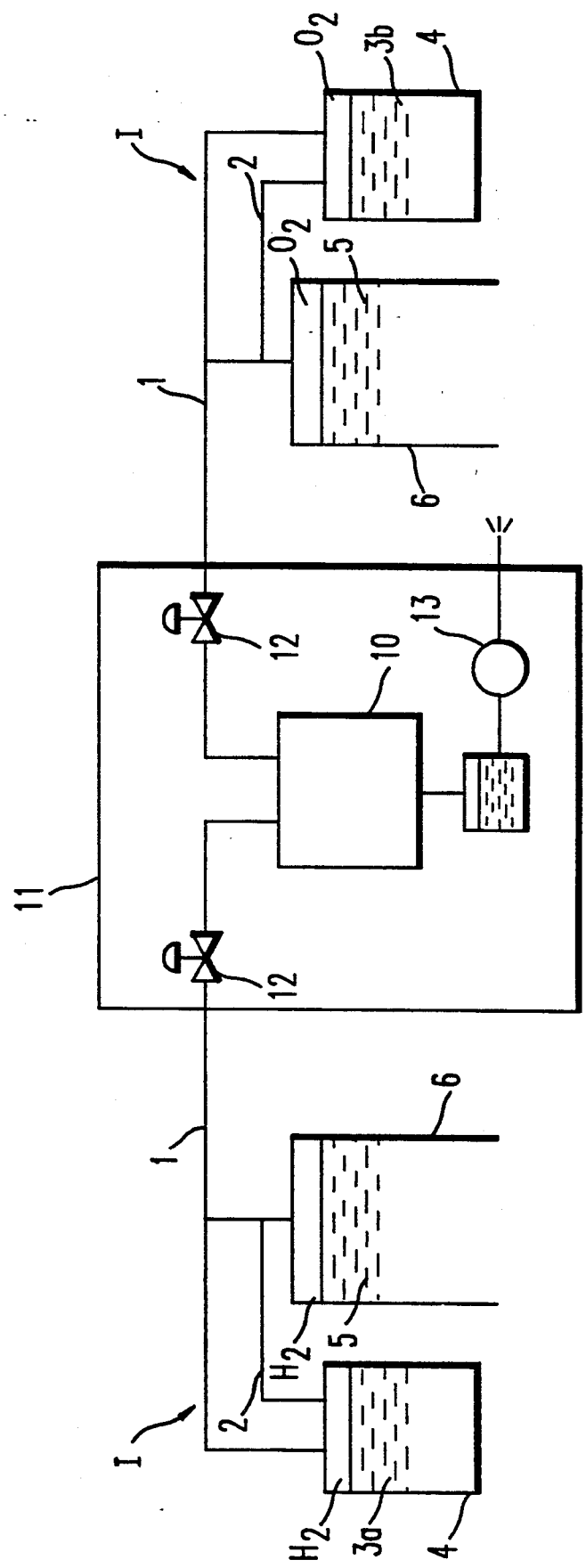

PRESSURE EQUALIZER FOR USE AT DEEP SEA

BACKGROUND OF THE INVENTION

The present invention relates to a pressure equalizer for use at deep sea as a pressure equalization or gas supply system.

When a vessel filled with a gas is to be dropped to the deep sea for installation of the vessel at a sea bed, the vessel itself is made pressure resistant to withstand a high pressure at the deep sea.

Such pressure resistance of the vessel is conventionally attained by increasing a wall thickness of the the pressure vessel. The increase of the wall thickness of the vessel for enhancement of mechanical strength of the same might be averted by using materials such as titanium, which is very expensive. However, a relatively large pressure vessel could not be constructed from titanium, which has poor machinability.

In view of the above, a primary object of the present invention is to provide a pressure equalizer for use at a deep sea which can equalize internal and external pressures of a vessel, whereby the vessel can be used at the deep sea without increasing the wall thickness of the vessel for the purpose of enhancing the mechanical strength of the vessel.

BRIEF DESCRIPTION OF THE DRAWINGS

FIGS. 2(A) to 2(F) illustrate changes of interrelation of a gas with the sea water in the equalizer in which FIG. 2(A) shows the state when the equalizer is dropped on the surface of the sea; FIG. 2(B), when the equalizer is sinking; FIG. 2(C), when the equalizer is landed on the sea bed; FIG. 2(D), when the gas is being used; FIG. 2(E), when the gas is replaced by the sea water; and FIG. 2(F), when the gas has been consumed;

FIG. 3 illustrates a system when the pressure equalizer according to the present invention is employed for supplying a gas at a deep sea.

DETAILED DESCRIPTION OF THE PREFERRED EMBODIMENT

Figure 1:
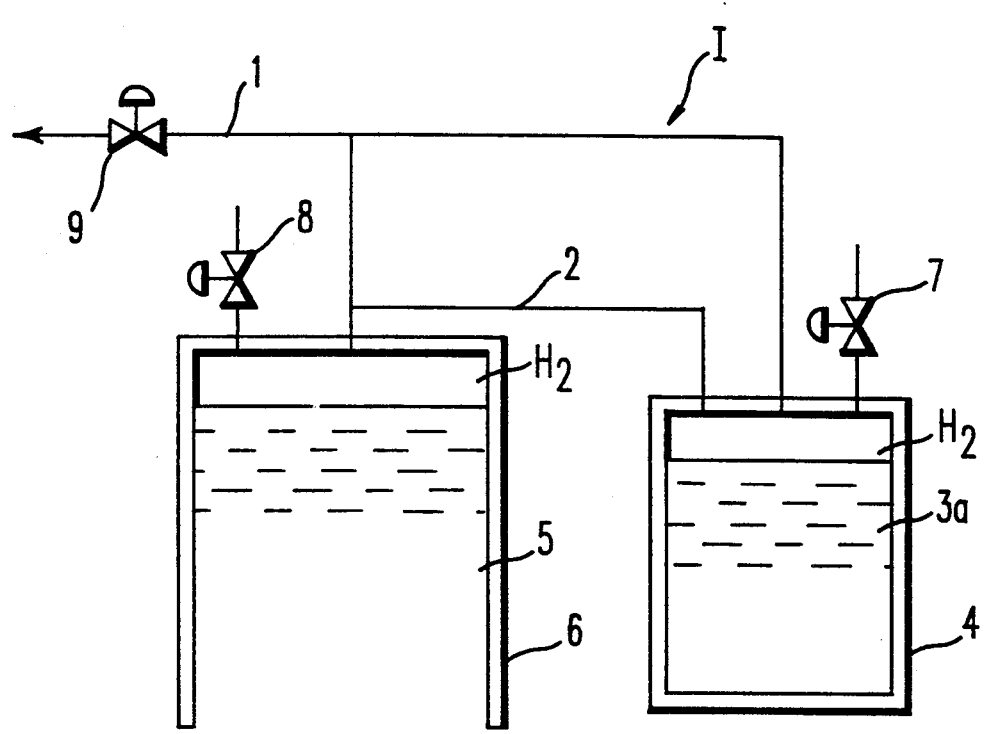
FIG. 1 is a schematic view of an embodiment of a pressure equalizer for use at a deep sea in accordance with the present invention.
Figure 2A:
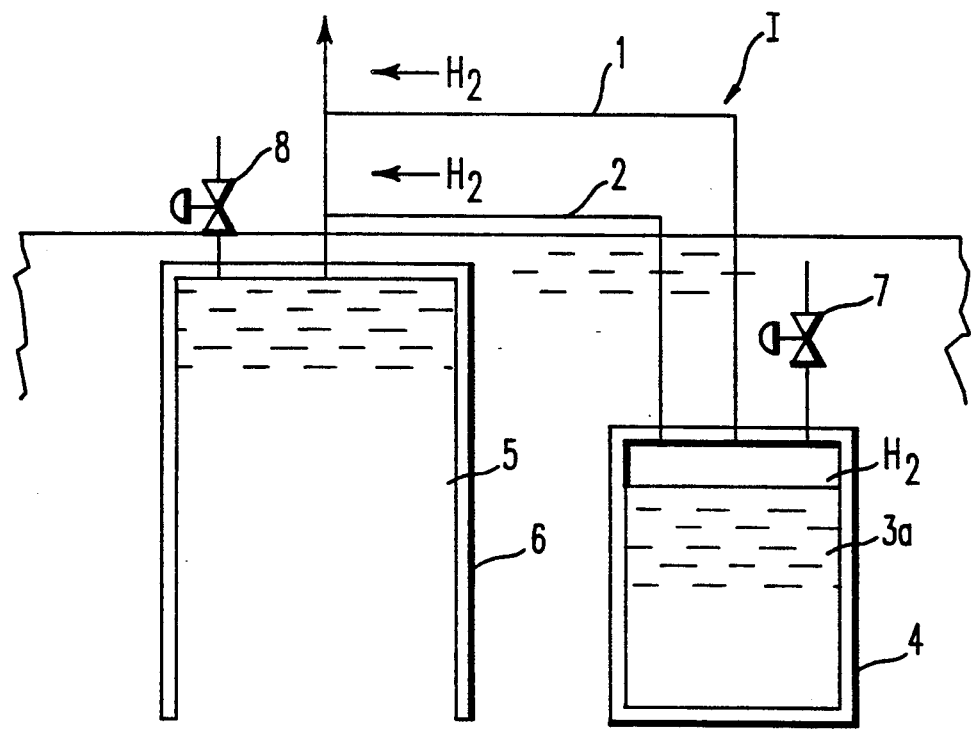
Figure 2B:
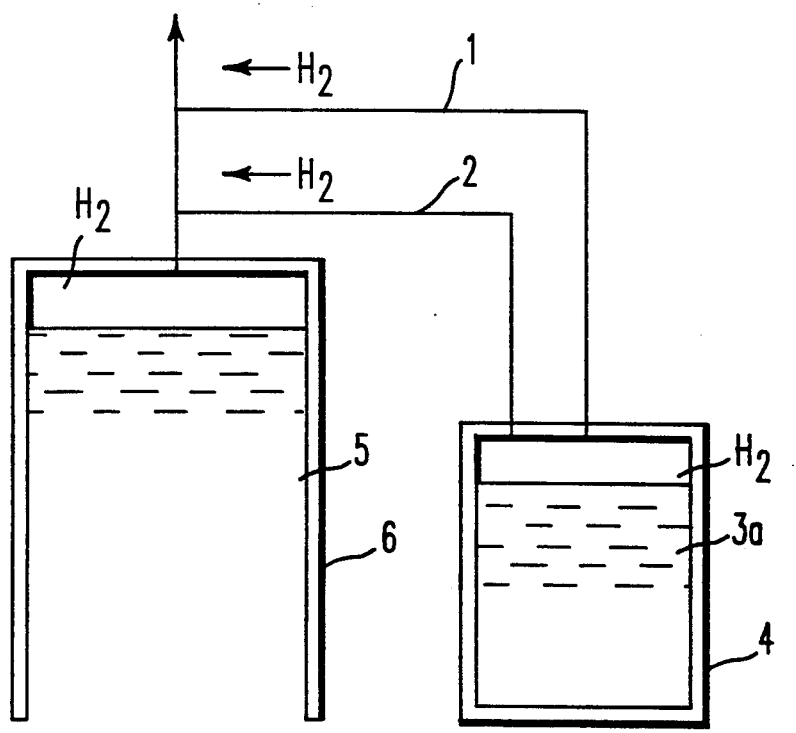
Figure 2C:
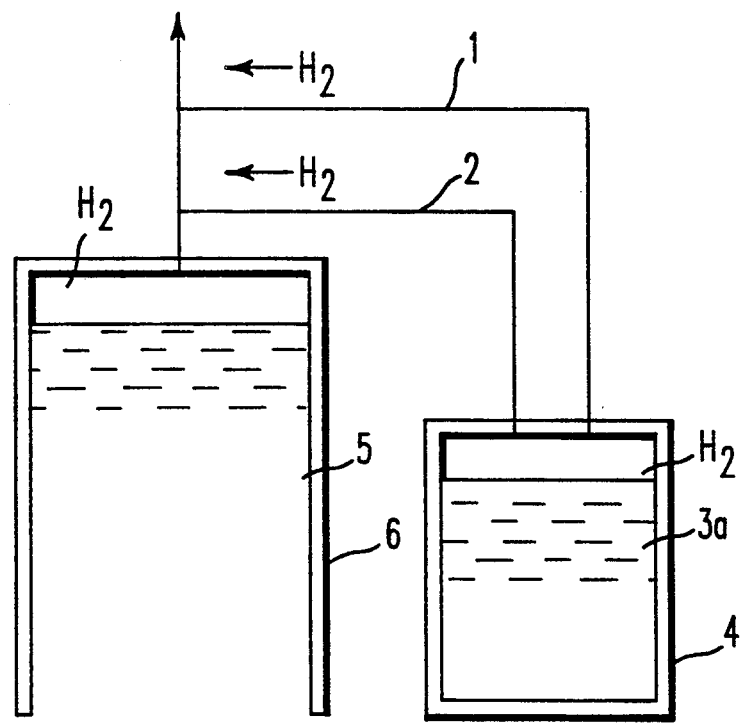
Figure 2D:
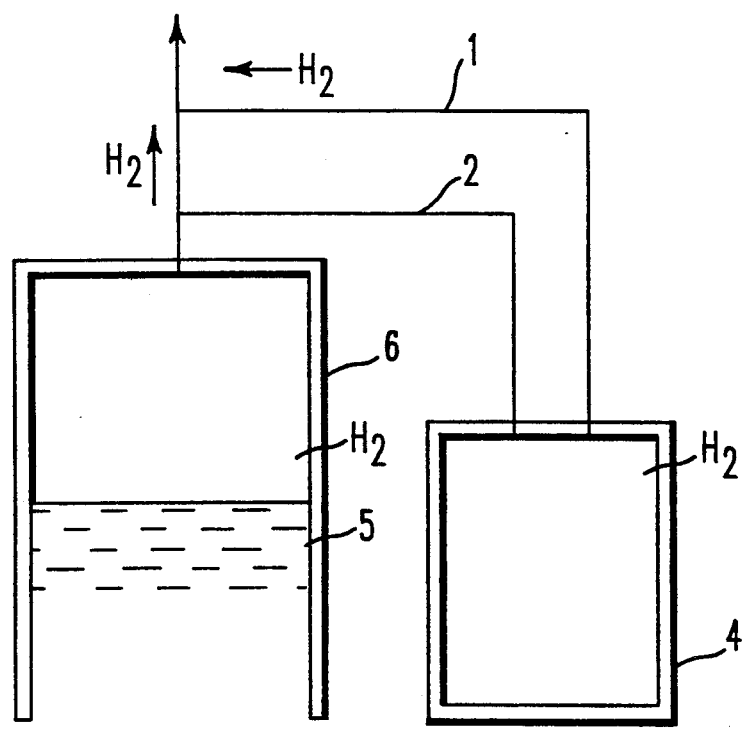
Figure 2E:
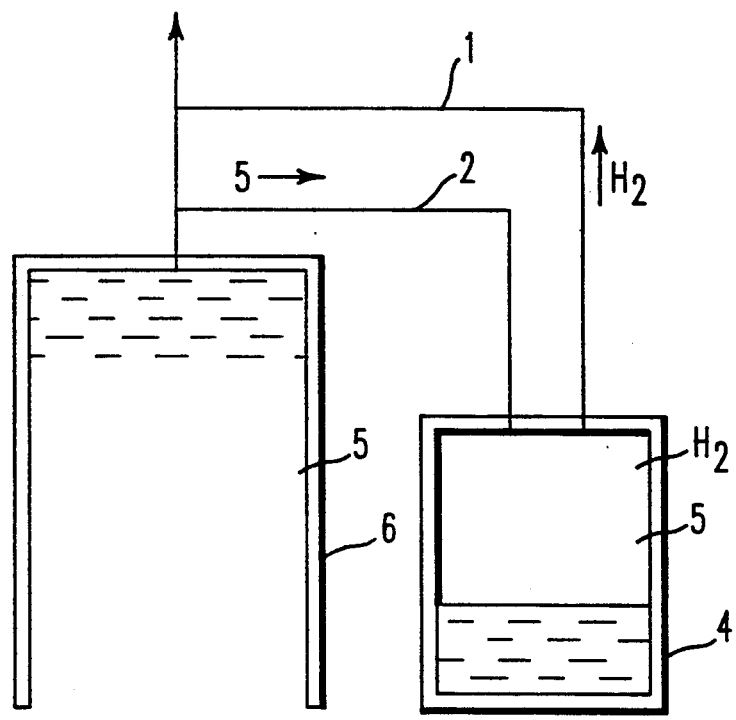
Figure 2F:
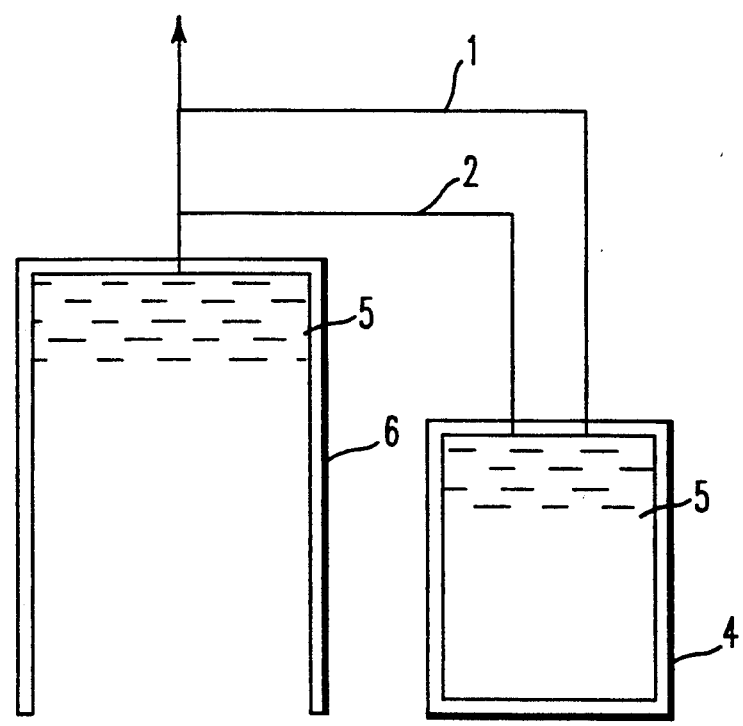

FIGS. 1 and 2(A) to 2(F) show an embodiment where the pressure equalizer in accordance with the present invention is used to supply a gas to a fuel cell which in turn supplies the electric power to an observation apparatus or the like at a deep sea. FIG. 1 illustrates the underlying principle of the present invention in which the equalizer comprises a gas generation tank 4 containing liquid hydrogen 3a and a gas storage tank 6 into and out of which the sea water 5 freely flows through a bottom of the tank 6 and which can store the hydrogen gas $H_2$ generated in the tank 4. Relieve valves 7 and 8 are respectively disposed at tops of the tanks 4 and 6. A gas supply line 1 is connected to the tops of the tanks 4 and 6 so as to supply the gas to the fuel cell. In addition, a communication line 2 interconnects the tops of the tanks 4 and 6 for their intercommunication. Thus, a pressure equalizer I is provided. It should be noted that the gas generation tank 4 has a properly heat-insulated outer surface. Reference numeral 9 denotes a flow-rate control valve in the gas supply line 1.

Though the gas generation tank 4 is of a heat-insulated structure as described above, heat will still penetrates through the heat-insulated structure into the gas generation tank 4 where it vaporizes the liquid hydrogen 3a into hydrogen gas $H_2$. The generated hydrogen gas $H_2$ flows through the gas supply line 1 to the fuel cell and the like and excess of the gas flows through the communication line 2 into the gas storage tank 6 where it is stored. In this connection, the hydrogen gas $H_2$ generated in the tank 4 has the temperature of $-252°$ C. and is readily raised in temperature to have substantially the same temperature as that of the sea water 5 during passage through the line 1 or 2. Under the above-described condition, the hydrogen gas $H_2$ within the storage tank 6 is always in contact with the sea water 5 and has a pressure balanced with the water pressure. Therefore, an internal pressure in the system including the tanks 4 and 6, the lines 1 and 2 and the fuel cell connected to the line 1 is equalized with the water or external pressure. As a result, both the tanks 4 and 6 can be made pressure equalization vessels with thin walls so that they can be made compact in size, light in weight and inexpensive in fabrication.

FIG. 2 schematically illustrates changes of the interrelation between the hydrogen gas $H_2$ and the sea water during the pressure equalizer dropped on the surface of the sea and sinking to a deep sea bed for use thereon. On a ship, the hydrogen gas $H_2$ vaporized from the liquid hydrogen 3a in the gas generating tank 4 is discharged by opening the relief valve 7 to thereby make the tank 4 free from the hydrogen gas $H_2$ while the gas storage tank 6 is filled with the air. Thereafter, the tanks 4 and 6 are dropped on the surface of the sea water with the relief valves 7 and 8 of the tanks 4 and 6 being respectively closed and opened. The sea water 5 flows into the tank 6 through the bottom of the latter and the air is discharged out of the tank 6 through the relief valve 8 (FIG. 2(A)). After the air has been discharged, the relief valve 8 is closed. As the tanks 4 and 6 sink, the water level in the gas storage tank 6 varies depending on variation of the water pressure and quantity of the hydrogen gas $H_2$ generated and the gas and water pressures are always maintained in equilibrium (FIG. 2(B)). Immediately after the landing on the sea bed, the same condition is maintained (FIG. 2(C)). However, the liquid hydrogen 3a continues to vaporize and, after all of the liquid hydrogen 3a has vaporized, to be supplied as hydrogen gas $H_2$ to the gas storage tank 6 so that the volume of the hydrogen gas $H_2$ in the gas storage tank 6 is increased until almost all the interior of the tank 6 is filled with the hydrogen gas $H_2$. Thereafter, as the hydrogen gas $H_2$ is gradually used by the fuel cell, the water level in the tank 6 rises (FIG. 2(D)). When all the hydrogen gas $H_2$ in the gas storage tank 6 has been consumed, the tank 6 is completely filled with the sea water and the sea water 5 flows through the communication line 2 into the tank 4 (FIG. 2(E)) so that the hydrogen gas $H_2$ in the tank 4 is completely replaced by the sea water 5 (FIG. 2(F)). In this manner, the hydrogen gas $H_2$ in the gas generating tank 4 has been completely consumed, the tank 4 is completely filled with the sea water 5 and the fuel cell is de-energized. In a case where the hydrogen gas $H_2$ is not required for energization of a fuel cell or the like, liquid nitrogen or the like may be used in place of the liquid hydrogen 3a and the pressure equalization may be maintained as shown in FIG. 2(D).

FIG. 3 illustrates a system for generating and supplying a gas oxide and a fuel gas to a fuel cell 10 in a vessel 11, using two pressure equalizers I of the type described above. One of the equalizers I on the left in FIG. 3 has the gas generating tank 4 filled with the liquid hydrogen 3a as described above with reference to FIG. 2 and the gas supply line 1 is connected to an anode of the fuel cell 10 so that the hydrogen gas generated in the tank 4 is supplied to the anode. In the other equalizer I on the right in FIG. 3, the gas generating tank 4 is filled with the liquid oxygen 3b and the gas supply line 1 is connected to a cathode of the fuel cell 10 so that the oxygen gas $O_2$ generated in the tank 4 is supplied to the cathode. In FIG. 3, reference numeral 12 denotes a flow control valve 12 in the gas supply lines 1; 13, a pump for discharging the water generated in the fuel cell 10.

With the system illustrated in FIG. 3, the hydrogen and oxygen gases $H_2$ and $O_2$ respectively generated in the tanks 4 can be directly supplied to the fuel cell 10.

Figure 4:
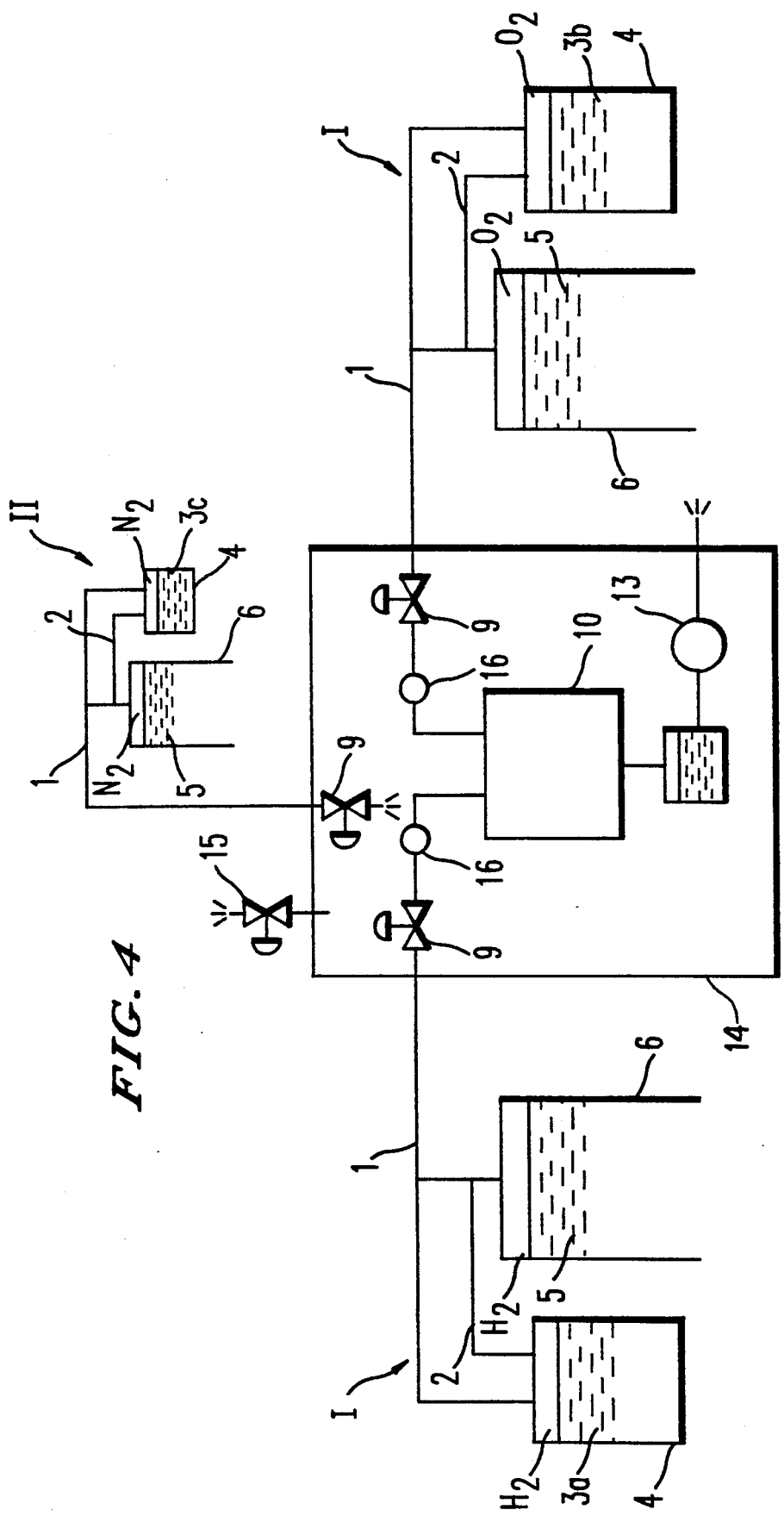
FIG. 4 illustrates a further application with the pressure equalizer according to the present invention.

Meanwhile, in a case where the fuel cell 10 is installed in a vessel 14 which is not pressure resistant in the system shown in FIG. 3 capable of directly supplying the gases generated by the pressure equalizers I, pressure equalization must be maintained also in the vessel 14. To this end, as shown in FIG. 4, a pressure equalizer II with a gas generating tank 4 filled with liquid nitrogen 3c is added and its gas supply line 1 is connected to the vessel 14 so that the nitrogen gas $N_2$ generated in the tank 4 of the equalizer II is supplied to the vessel 14, whereby the internal pressure in the vessel 14 is maintained in equilibrium with the water pressure from the state shown in FIG. 2(A). In FIG. 4, reference numeral 15 designates a pressure regulating valve 15; and 16, blowers.

In the system shown in FIG. 4, the internal and external pressures of the vessel 14 can be balanced so that the vessel 14 can be converted into a pressure equalizer and consequently the wall thickness of the vessel 14 can be made thin.

It is to be understood that the present invention is not limited to the above-mentioned embodiment and that various modifications may be made within the true spirit of the present invention. For example, so far there has been described that each gas generating tank 4 contains a low-temperature liquiefied gas such as liquid hydrogen 3a, liquid oxygen 3b or liquid nitrogen 3c which vaporizes to become a gas while increasing its volume. Instead of the liquefied gas, a compound such as hydrogen absorbed alloy may be used which will generate a gas in response to any variation in temperature and/or pressure. Instead of the gas generating tank containing the liquefied gas, a gas tank containing high-pressure gas itself may be used which is a pressure vessel due to the contained high-pressure gas. In this latter case, when the pressure of the water surrounding the tank becomes substantially equal to an inner pressure of the tank, equalizing valves for the gas tank are opened to feed the gas to the gas storage tank, thereby attaining the pressure equalization.

What is claimed is:

1. A pressure equalizer for use for storing, generating and dispensing gas from substantially thin walled tanks at great depth beneath the sea comprising a gas generating tank containing a low-temperature, liquified gas which upon the application of heat generates a high-pressure gas, a gas storage tank into and out of which sea water freely flows through the bottom thereof, a gas supply line connected at one end by branches to the tops of the respective tanks and at the other end to a device utilizing gas generated in said gas generating tank, and a pipeline interconnecting the respective tanks at their tops, said tanks having pressure equalizing valves.

* * * * *